US011281811B2

(12) United States Patent
Wang et al.

(10) Patent No.: US 11,281,811 B2
(45) Date of Patent: Mar. 22, 2022

(54) METHOD, APPARATUS AND DEVICE FOR STORING VEHICULAR DATA (71) Applicant: Baidu Online Network Technology (Beijing) Co., Ltd., Beijing (CN)

(72) Inventors: Mingwei Wang, Beijing (CN); Peng Yun, Beijing (CN); Shaohua Zhang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 339 days.

(21) Appl. No.: 16/025,565

(22) Filed: Jul. 2, 2018

(65) Prior Publication Data
US 2019/0012488 A1 Jan. 10, 2019

(30) Foreign Application Priority Data
Jul. 4, 2017 (CN) .......................... 201710539181.9

(51) Int. Cl.
*G06F 21/78* (2013.01)
*G09C 1/00* (2006.01)
*H04L 9/14* (2006.01)
*H04L 9/08* (2006.01)
*G06F 21/62* (2013.01)

(52) U.S. Cl.
CPC .......... *G06F 21/78* (2013.01); *G06F 21/6209* (2013.01); *G09C 1/00* (2013.01); *H04L 9/088* (2013.01); *H04L 9/14* (2013.01); *H04L 2209/84* (2013.01)

(58) Field of Classification Search
CPC ................................. G06F 21/78; G09C 1/00
See application file for complete search history.

(56) References Cited

U.S. PATENT DOCUMENTS

| 8,729,857 | B2 * | 5/2014 | Stahlin | H04B 3/542 |
| | | | | 320/109 |
| 10,210,771 | B2 | 2/2019 | Surpi | |
| 2008/0235520 | A1 * | 9/2008 | Becker | G06F 13/4081 |
| | | | | 713/189 |

(Continued)

FOREIGN PATENT DOCUMENTS

| CN | 103391185 A | 11/2013 |
| CN | 103780622 A | 5/2014 |

(Continued)

*Primary Examiner* — Lynn D Feild
*Assistant Examiner* — Vladimir I Gavrilenko
(74) *Attorney, Agent, or Firm* — Nixon Peabody LLP (57) ABSTRACT

A method, apparatus and device for storing vehicular data. An embodiment of a method for storing vehicular data includes: analyzing importance of received vehicular data to determine a storage level of the vehicular data; acquiring a corresponding key and a corresponding encryption algorithm based on the storage level of the vehicular data; encrypting the vehicular data using the acquired key and the acquired encryption algorithm; and storing encrypted vehicular data in a storage area corresponding to the storage level of the vehicular data. The embodiment may improve the safety of vehicular data by encrypted storage of the data in different levels, effectively prevent important vehicular data from being illegally read or maliciously falsified, and improve the storage efficiency of the vehicular data.

11 Claims, 3 Drawing Sheets (56) References Cited

U.S. PATENT DOCUMENTS

| | | | | |
|---|---|---|---|---|
| 2013/0263277 A1* | 10/2013 | Ely | ......................... | G06F 21/78 |
| | | | | 726/26 |
| 2015/0318913 A1 | 11/2015 | Lauer | | |
| 2017/0278320 A1* | 9/2017 | Isozaki | ................... | H04L 9/088 |
| 2019/0109848 A1* | 4/2019 | Clark | .................. | G06F 21/6263 |
| 2019/0199524 A1* | 6/2019 | Takemori | .............. | H04L 9/0894 |

FOREIGN PATENT DOCUMENTS

| | | |
|---|---|---|
| CN | 105450645 A | 3/2016 |
| CN | 105830489 A | 8/2016 |
| CN | 106022196 A | 10/2016 |

\* cited by examiner

METHOD, APPARATUS AND DEVICE FOR STORING VEHICULAR DATA

CROSS-REFERENCE TO RELATED APPLICATIONS

This application is related to and claims priority from Chinese Application No. 201710539181.9, filed on Jul. 4, 2017 and entitled "Method, Apparatus and Device for Storing Vehicular Data," the entire disclosure of which is hereby incorporated by reference.

TECHNICAL FIELD

The present disclosure relates to the field of computer technology, specifically to the field of data storage technology, and more specifically to a method, apparatus and device for storing vehicular data.

BACKGROUND

With the rapid development of Internet technology and artificial intelligence technology, autonomous vehicles, as a novel means of transport, have the promise of being increasingly widely used. Moreover, with the development of the function and interface diversification design of the autonomous vehicles, the safety of the autonomous vehicles is increasingly more threatened.

A black box of an autonomous vehicle is a device for recording vehicular data of the autonomous vehicle, the data recorded therein may be used as the basis for driving behavior analysis and accident analysis, and developers may retrieve data in the black box using a data acquisition instruction. The existing black box of an autonomous vehicle usually successively stores all data in temporal sequence, and some important data in the black box of the autonomous vehicle may, when subjected to a hostile cyber attack, be lost or falsified, thereby failing to provide accurate data support for subsequent driving behavior analysis and accident analysis. Therefore, safety protection of the black box in the autonomous vehicle is to be improved.

SUMMARY

In order to solve one or more of the technical problems mentioned in the background section, embodiments of the present disclosure provide a method, apparatus and device for storing vehicular data.

In a first aspect, an embodiment of the present disclosure provides a method for storing vehicular data, comprising: analyzing importance of received vehicular data to determine a storage level of the vehicular data; acquiring a corresponding key and a corresponding encryption algorithm based on the storage level of the vehicular data; encrypting the vehicular data using the acquired key and the acquired encryption algorithm; and storing encrypted vehicular data in a storage area corresponding to the storage level of the vehicular data.

In some embodiments, the analyzing importance of received vehicular data to determine a storage level of the vehicular data includes: determining a data type of the vehicular data based on a type of a sensor collecting the vehicular data or a type of a device generating the vehicular data; acquiring a data transmission speed of the vehicular data; matching the data type and the data transmission speed of the vehicular data with a preset data type and a preset data transmission speed corresponding to each of preset storage levels, and determining the storage level of the vehicular data based on a matching result.

In some embodiments, the analyzing importance of received vehicular data to determine a storage level of the vehicular data further includes: analyzing the vehicular data, determining whether the vehicular data contain preset critical data corresponding to each of preset storage levels, and determining the storage level of the vehicular data from a plurality of the preset storage levels based on a determining result.

In some embodiments, the method further includes: setting and saving a key and an encryption algorithm corresponding to each of the storage levels; wherein complexities of keys corresponding to different storage levels are different, and speeds of encryption algorithms corresponding to different storage levels are different.

In some embodiments, the method further includes: dividing a storage space into a plurality of storage areas, each of the storage areas at least corresponding to a storage level.

In a second aspect, an embodiment of the present disclosure provides an apparatus for storing vehicular data, comprising: an analysis unit, configured to analyze importance of received vehicular data to determine a storage level of the vehicular data; an acquisition unit, configured to acquire a corresponding key and a corresponding encryption algorithm based on the storage level of the vehicular data; an encryption unit, configured to encrypt the vehicular data using the acquired key and the acquired encryption algorithm; and a storage unit, configured to store encrypted vehicular data in a storage area corresponding to the storage level of the vehicular data.

In some embodiments, the analysis unit is further configured to analyze importance of received vehicular data by: determining a data type of the vehicular data based on a type of a sensor collecting the vehicular data or a type of a device generating the vehicular data; acquiring a data transmission speed of the vehicular data; matching the data type and the data transmission speed of the vehicular data with a preset data type and a preset data transmission speed corresponding to each of preset storage levels, and determining the storage level of the vehicular data based on a matching result.

In some embodiments, the analysis unit is further configured to analyze importance of received vehicular data by: analyzing the vehicular data, determining whether the vehicular data contain preset critical data corresponding to each of preset storage levels, and determining the storage level of the vehicular data from a plurality of the preset storage levels based on a determining result.

In some embodiments, the apparatus further includes: a configuration unit configured to set setting and save a key and an encryption algorithm corresponding to each of the storage levels; wherein complexities of keys corresponding to different storage levels are different, and speeds of encryption algorithms corresponding to different storage levels are different.

In some embodiments, the apparatus further includes: a division unit configured to divide a storage space into a plurality of storage areas, each of the storage areas at least corresponding to a storage level.

In a third aspect, an embodiment of the present disclosure provides a device for storing vehicular data, including: a memory, for storing vehicular data and one or more programs, and one or more processors; where the one or more programs enable, when executed by the one or more processors, the one or more processors to implement the method for storing vehicular data.

A method, apparatus and device for storing vehicular data provided by the present disclosure first analyze importance of received vehicular data to determine a storage level of the vehicular data, then acquire a corresponding key and a corresponding encryption algorithm based on the storage level of the vehicular data, subsequently encrypt the vehicular data using the acquired key and the acquired encryption algorithm, and finally store encrypted vehicular data in a storage area corresponding to the storage level of the vehicular data. The present disclosure may improve the safety of vehicular data by encrypted storage of the data in different levels, effectively prevent important vehicular data from being illegally read or maliciously falsified, and improve the storage efficiency of the vehicular data.

BRIEF DESCRIPTION OF THE DRAWINGS

By reading and referring to detailed description on the non-limiting embodiments in the following accompanying drawings, other features, objects and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
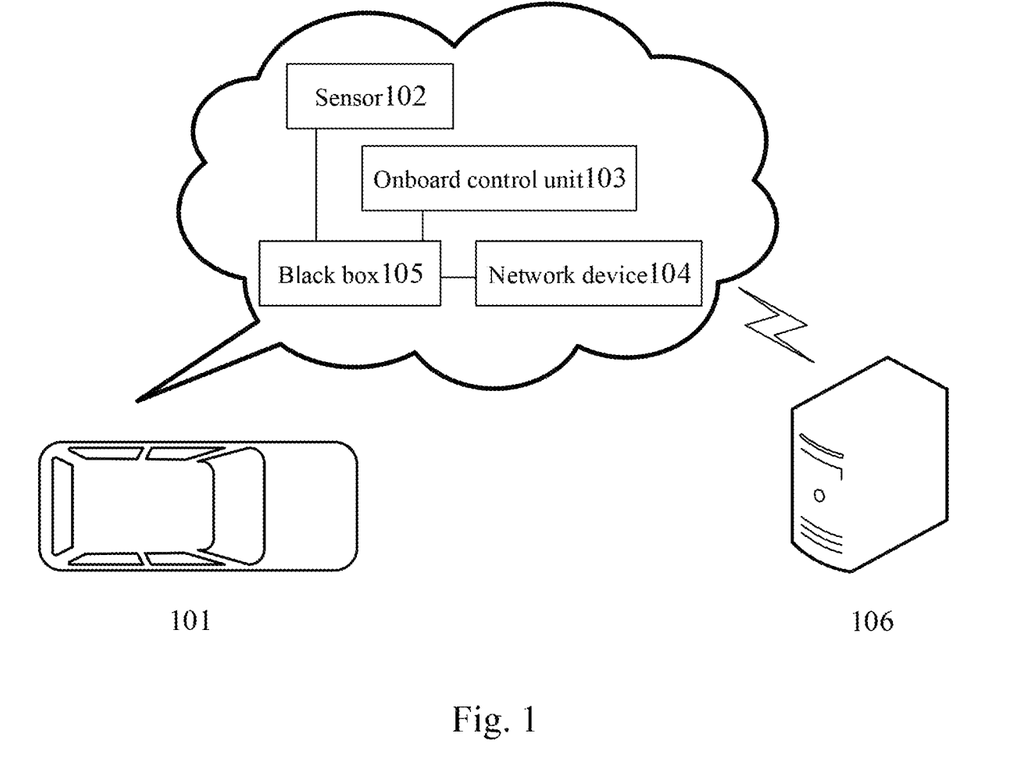
FIG. 1 is an architectural diagram of an exemplary system in which the present disclosure may be implemented.

Please refer to FIG. 1, FIG. 1 shows an architectural diagram of an exemplary system in which the present disclosure may be implemented.

As shown in FIG. 1, the system architecture 100 may include an autonomous vehicle 101 and a cloud server 106. The autonomous vehicle 101 may include a plurality of sensors 102, an onboard control unit 103, a network device 104 and a black box 105. The sensors 102 may be various sensors of the autonomous vehicle, such as a collision sensor, a brake sensor, an airbag sensor, a speed sensor and an engine inlet pressure sensor. The onboard control unit 103 may be the "brain" of the autonomous vehicle, and may be used for making a control decision based on acquired information of a road condition and acquired information of an autonomous vehicle driving state and sending instructions to respective control parts of the autonomous vehicle. The network device 104 may be used for connecting the autonomous vehicle 101 with an external device, where the connection type is not limited to a wired connection or a wireless connection. The black box 105 is used for storing data. The black box 105 may be connected with the sensor 102 and the onboard control unit 103. The data acquired by the sensor 102 and the instructions sent by the onboard control unit 103 are recorded in the black box 105.

The cloud server 106 may be a server providing services for storing vehicular data for the autonomous vehicle 101, and the cloud server may further analyze and process stored vehicular data of the autonomous vehicle. The cloud server 106 may be connected with the autonomous vehicle 101 via a network to send or receive messages.

The autonomous vehicle 101 may send data collected by the sensor 102 and vehicular data acquired by the black box 105 from the sensor 102, the onboard control unit 103 and the like, to the cloud server. The cloud server 106 may receive a request message for storing vehicular data sent by the autonomous vehicle 101, respond to the request message, and then send a feedback on a processing result of the request message to the autonomous vehicle 101. The processing result of the request message may be, for example, a message informing the autonomous vehicle 101 of having successfully stored the uploaded vehicular data.

It should be noted that the method for storing vehicular data provided by an embodiment of the present disclosure may be executed by the black box 105 or the cloud server 106. Accordingly, the apparatus for storing vehicular data may be set in the black box 105 or the cloud server 106.

It should be understood that the numbers of cloud servers, autonomous vehicles, sensors, network devices and black boxes in FIG. 1 are only illustrative. There may be any number of cloud servers, autonomous vehicles, sensors, network devices and black boxes based on implementation needs.

Figure 2:
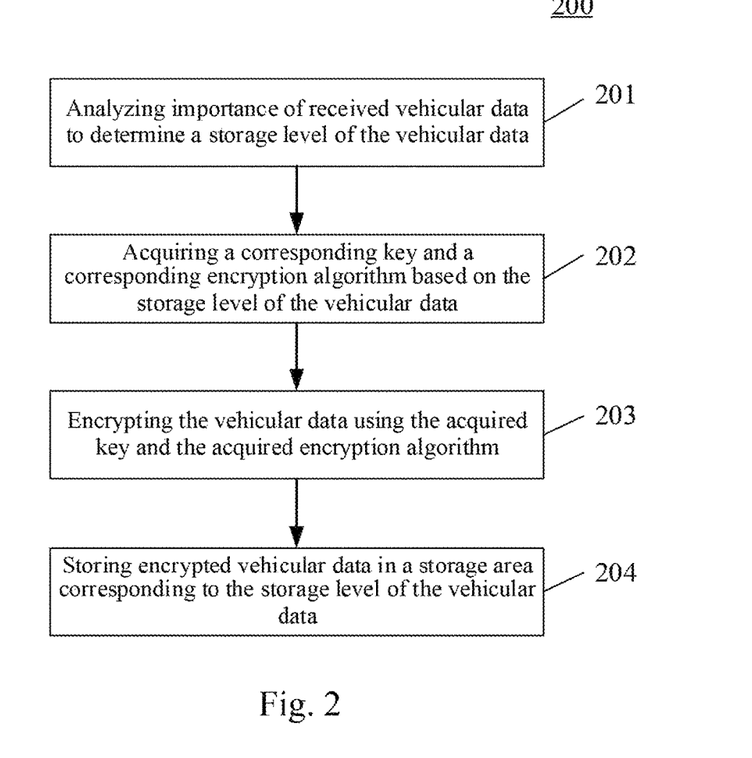
FIG. 2 is a flowchart diagram of an embodiment of a method for storing vehicular data according to the present disclosure.

Further referring to FIG. 2, a flow 200 of an embodiment of a method for storing vehicular data according to the present disclosure is shown. The method for storing vehicular data includes the following steps.

Step 201: analyzing importance of received vehicular data to determine a storage level of the vehicular data.

In the embodiment, an electronic device (e.g., the black box or the cloud server shown in FIG. 1) on which the method for storing vehicular data is performed may receive vehicular data transmitted from respective sensors and control units on the vehicle. The vehicle here may be an autonomous vehicle. Specifically, the electronic device may be connected with the respective sensors and the control units via a bus, and then may receive data packets collected by the sensors and the control units via the bus. The electronic device may also receive data collected by the sensors and the control units via a network, and specifically may receive vehicular data via the network in response to data transmission requests from the sensors and the control units.

After receiving vehicular data, importance of the vehicular data may be analyzed to determine a storage level of the vehicular data. Here, the importance of the vehicular data may correspond to a storage level thereof. For example, important data correspond to a relatively high storage level, while ordinary data correspond to a low storage level. Importance of vehicular data may be directly associated with an importance degree of the vehicular data for vehicle driving behavior analysis, accident analysis, and the like.

For example, data collected by an acceleration sensor and road condition data collected by a camera during a vehicle collision may provide accurate and reliable analysis basis for subsequent accident cause analysis, so these data are data of a high importance degree. A turning control instruction, a parking instruction and the like during normal vehicle driving are less important for driving behavior analysis or accident analysis, so these data are data of a low importance degree.

In the embodiment, an importance degree of data may be determined by analyzing an association of the data with an accident and a vehicle malfunction, and may also be determined by detecting whether vehicular data are consistent with simulation data under a normal driving condition. For example, when an inconsistency between vehicular data and simulation data under a normal driving condition is detected, the received vehicular data are determined to be of a high importance degree.

In the embodiment, in order to more rationally use a storage space to store vehicular data, the vehicular data collected in different scenarios at different moments may be stored in different levels according to different storage levels. A storage level of vehicular data may be determined based on importance analysis result of the vehicular data. Specifically, a list of correspondence between an importance degree and a storage level of vehicular data may be preset, and after analyzing an importance degree of vehicular data to determine the importance degree, a storage level may be determined based on the preset correspondence list.

In some optional implementations of the embodiment, the analyzing importance of received vehicular data to determine a storage level of the vehicular data may include: determining a data type of the vehicular data based on a type of a sensor collecting the vehicular data or a type of a device generating the vehicular data; acquiring a data transmission speed of the vehicular data; matching the data type and the data transmission speed of the vehicular data with a preset data type and a preset data transmission speed corresponding to each of preset storage levels, and determining the storage level of the vehicular data based on a matching result.

Specifically, in some optional implementations of determining a data type of vehicular data, a data format of vehicular data collected by different sensors may be different, and a data format of vehicular data generated by a sensor may also be different from a data format of vehicular data generated by a control unit. The electronic device on which the method for storing vehicular data is performed may identify a sensor collecting vehicular data, a control unit generating the vehicular data, and the like, based on a data format of received vehicular data, so as to determine a corresponding sensor type and a corresponding device type based on the identified sensor, the identified control unit, and the like, and then determine a data type of the vehicular data.

In some other optional implementations of determining a type data of vehicular data, a sensor, a control unit, and the like may attach an identifier of a device acquiring the vehicular data to the collected or generated vehicular data. After receiving the vehicular data, the electronic device may identify a type of a sensor collecting the vehicular data or a type of a device generating the vehicular data based on the identifier, so as to determine the data type based on the type of the sensor or the type of the device.

Here, the data type of the vehicular data may include a plurality of preset types, and may, for example, include an important type and an ordinary type. There is also a preset correspondence between a sensor type and a data type, e.g., a collision sensor corresponds to an important data type. In the determining a data type of the vehicular data based on a type of a sensor collecting the vehicular data or a type of a device generating the vehicular data, the type of the sensor may be determined based on a sensor associated with a vehicle state, such as collision, malfunction and normal driving. For example, a collision sensor and an airbag sensor are associated with a "collision" state, while an anti-lock braking systems (ABS) sensor, a brake pressure sensor, and the like are associated with a "malfunction" state. Types of these sensors may be predefined and stored in the electronic device, so that data types of the vehicular data may be determined based on predefined sensor types of the sensors when analyzing importance of the vehicular data.

Optionally, the determining a data type of the vehicular data based on a type of a sensor collecting the vehicular data or a type of a device generating the vehicular data may further include: detecting whether a sensor is associated with a traffic accident, and determining the data type of the vehicular data corresponding to the type of the sensor being an important type if the sensor is associated with the traffic accident. For example, when detecting a sensor collecting vehicular data being an airbag sensor, the vehicular data may be determined as important data, i.e., determining the data type of the vehicular data collected by the airbag sensor being an important type.

A data transmission speed of vehicular data may represent the number of bytes of data transmitted to a data receiving port of an electronic device on which the method for storing vehicular data is performed per unit time. A data transmission speed of vehicular data and a storage level of the data may correspond to each other, so as to select an encryption algorithm of a corresponding speed in a subsequent encryption process.

In a practical scenario, sensors collect data at different frequencies and a control unit generates different control data at different frequencies when a vehicle is driving, so that data transmission speeds of different vehicular data are also different. Therefore, data types of different vehicular data may be determined based on data transmission speeds, and then an importance degree of the vehicular data may be determined.

The black box may receive the vehicular data through a controller area network (CAN) bus. In the embodiment, a transmission speed of vehicular data may be detected by a receiving port connected with the CAN bus.

After determining a data type of vehicular data and acquiring a data transmission speed of the vehicular data, the data type and the data transmission speed of to-be-stored vehicular data may be matched with a preset data type and a preset data transmission speed corresponding to each of preset storage levels, and then the storage level of the vehicular data may be determined from the preset storage levels based on a matching result. That is, the data type and the data transmission speed corresponding to each of preset storage levels may be preset, and a preset storage level corresponding to the data type and the data transmission speed of the received vehicular data may be found as a storage level of the received vehicular data. Therefore, importance of vehicular data may be determined based on information of a sensor or device associated the vehicular data and a transmission rate of the vehicular data, and then a storage level of the vehicular data may be determined.

In some other optional implementations of the embodiment, the analyzing importance of received vehicular data to determine a storage level of the vehicular data may include: analyzing the vehicular data, determining whether the vehicular data contain preset critical data corresponding to each of preset storage levels, and determining the storage level of the vehicular data from a plurality of the preset storage levels based on a determining result.

In this implementation, the electronic device may preset critical data corresponding to each of the preset storage levels, and may determine, if the vehicular data are determined to contain critical data corresponding to a preset storage level after analyzing the vehicular data, the storage level of the vehicular data as the preset storage level.

For example, critical data corresponding to a highest storage level, including a control instruction of an aeration component detonating an airbag during vehicle collision, may be set, so that when detecting the vehicular data including the control instruction of the aeration component detonating the airbag, the storage level of the current vehicular data may be determined as the highest storage level.

Step 202: acquiring a corresponding key and a corresponding encryption algorithm based on the storage level of the vehicular data.

In the embodiment, keys and encryption algorithms corresponding to different storage levels may be preset, and after determining a storage level of the vehicular data in the step 201, a corresponding key and a corresponding encryption algorithm may be found.

In the embodiment, each storage level has a key and an encryption algorithm corresponding thereto. A key complexity, an encryption algorithm complexity, and an encryption algorithm speed of each storage level may be different.

In a practical scenario, for vehicular data of a high importance degree that have, after being maliciously falsified or acquired, a great influence on the accuracy and reliability of subsequent driving behavior analysis and accident cause investigation results based on the vehicular data, a key of a high complexity and an encryption algorithm of a high complexity may be used during encryption to enhance the decryption difficulty thereof. Therefore, a complex key and a complex encryption algorithm may be set for a high storage level. For vehicular data of a low importance degree that have, after being maliciously falsified or acquired, a small influence on the accuracy and reliability of subsequent driving behavior analysis and accident cause investigation results based on the vehicular data, a key of a low complexity and an encryption algorithm of a low complexity may be selected to enhance the encryption speed, thereby enhancing the data storage speed.

Here, the key may be randomly generated based on the complexity requirements, and may also be manually set. The encryption algorithm may include encryption algorithms of a plurality of different speeds, including but not limited to conventional Advanced Encryption Standard (AES), RC4, Blowfish, RSA, MD5, and the like.

In some optional implementations of the embodiment, the method for storing vehicular data may further include: setting and saving a key and an encryption algorithm corresponding to each of the storage levels. Here, complexities of keys corresponding to different storage levels are different, and speeds of encryption algorithms corresponding to different storage levels are different. In other words, a plurality of keys and encryption algorithms may be preset, and stored in a preset storage area, so that after receiving vehicular data and determining a storage level, a corresponding key and a corresponding encryption algorithm may be acquired from the preset storage area. Optionally, the plurality of keys and encryption algorithms may be stored in a safe file system using a safe storage application provided by a TrustZone, and when acquiring a key and an encryption algorithm, the key and the encryption algorithm are successively read via an interface of the TrustZone safe storage application.

Step 203: encrypting the vehicular data using the acquired key and the acquired encryption algorithm.

In the embodiment, vehicular data may be encrypted using a key and an encryption algorithm corresponding to a storage level of the vehicular data. Specifically, logic of the encryption algorithm is executed with the key as a parameter, and plaintext vehicular data are converted into a ciphertext.

Step 204: storing encrypted vehicular data in a storage area corresponding to the storage level of the vehicular data.

After obtaining a ciphertext by encrypting the vehicular data, the electronic device on which the method for storing vehicular data is performed may store the ciphertext in a storage area corresponding to the storage level of the vehicular data. The storage area here may be an area having an identifier corresponding to the storage level. The storage area may include a permanent storage area and an erasable area. Furthermore, the erasable area may be divided into a plurality of subareas, and the storage time of data in each of the subareas is different, i.e., data in each subarea of the erasable area may be covered in different time periods. In the embodiment, each storage level corresponds to a storage area.

In an exemplary application scenario, the storage level of vehicular data during vehicle collision is the highest level, and the vehicular data of the highest level may be encrypted and then stored in the permanent storage area. The storage level of vehicular data during normal vehicle driving is the lowest level, and the vehicular data of the lowest level may be encrypted and then stored in the erasable storage area.

In some optional implementations of the embodiment, the method for storing vehicular data may further include dividing a storage space into a plurality of storage areas, where each of the storage areas at least corresponds to a storage level. Specifically, a physical address range for storing vehicular data may be divided and marked. Optionally, a corresponding storage space may be marked using the physical address range, and correspond to a storage level. Thus, after obtaining a ciphertext of encrypted vehicular data, the ciphertext may be written in a physical address of a corresponding storage space, and an index of the ciphertext is created to facilitate finding corresponding vehicular data based on the index in subsequent retrieval of the vehicular data.

A method for storing vehicular data provided by the embodiments of the present disclosure first analyzes importance of received vehicular data to determine a storage level of the vehicular data, then acquires a corresponding key and a corresponding encryption algorithm based on the storage level of the vehicular data, subsequently encrypts the vehicular data using the acquired key and the acquired encryption algorithm, and finally stores encrypted vehicular data in a storage area corresponding to the storage level of the vehicular data. The method has achieved encrypted storage of vehicular data in different levels, thereby improving the safety of vehicular data storage, effectively preventing important vehicular data from being illegally read or maliciously falsified, and improving the storage efficiency of the vehicular data.

Figure 3:
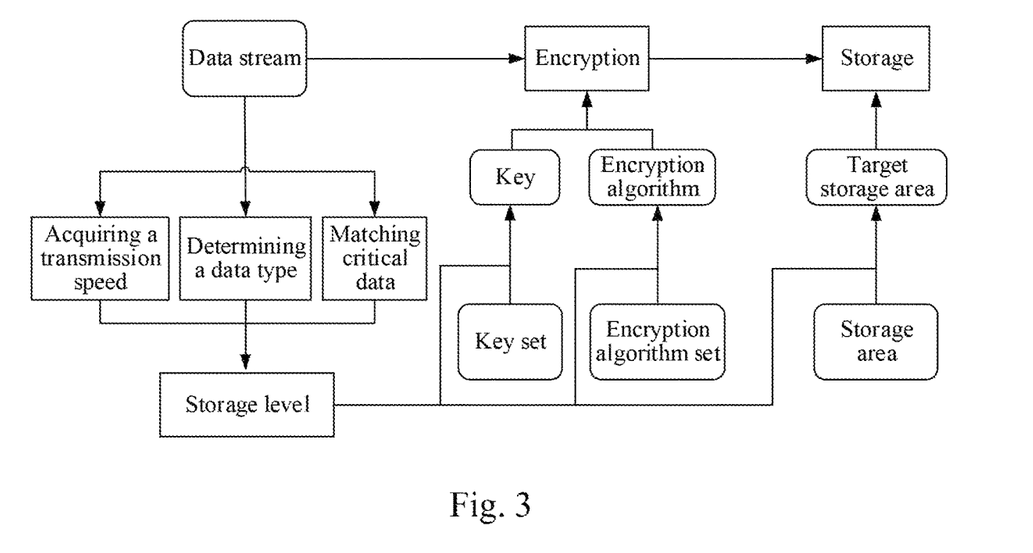
FIG. 3 is a schematic diagram of a principle of a specific implementation scenario of a method for storing vehicular data according to the present disclosure.

Please refer to FIG. 3, FIG. 3 shows a schematic diagram of a principle of a specific implementation scenario of a method for storing vehicular data according to the present disclosure.

As shown in FIG. 3, vehicular data are transmitted in the form of data stream to a port of a device for storing vehicular data. The device may acquire a transmission speed of the data stream, determine a data type of the data stream, and match whether the data stream includes preset critical data, to determine a storage level of the data stream. Subsequently, a key corresponding to the storage level of the data stream may be acquired from a key set, an encryption algorithm corresponding to the storage level may be determined from an encryption algorithm set, and the data stream may be encrypted. Finally, a target storage area may be determined from a storage area based on the storage level, and the encrypted data stream may be stored in the target storage area.

As may be seen from FIG. 3, a key and an encryption algorithm are selected and a storage area is determined based on a storage level, so that, when reading stored vehicular data, vehicular data of different levels may be distinguished based on a decryption difficulty and a storage location of the data, so as to quickly acquire an importance degree of the data. Furthermore, important data may be encrypted using a complex key and stored in a safer storage area, which may improve the reading difficulty of the important data, and better protect the data from being falsified.

Figure 4:
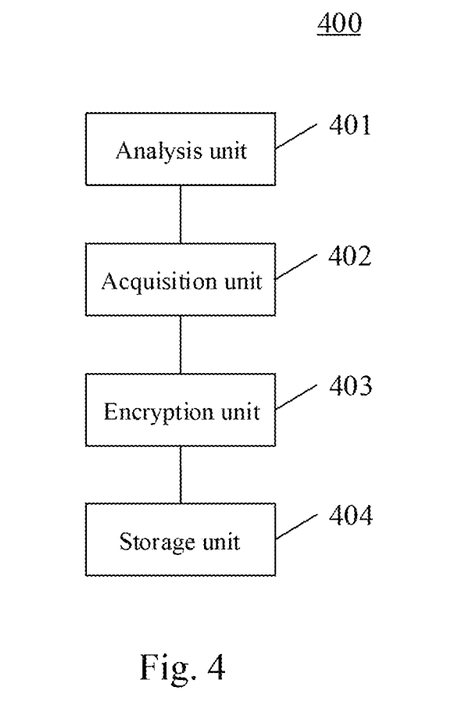
FIG. 4 is a schematic structural diagram of an embodiment of an apparatus for storing vehicular data according to the present disclosure.

By further referring to FIG. 4, as an implementation of the method, the present disclosure provides an embodiment of an apparatus for storing vehicular data.

As shown in FIG. 4, an apparatus 400 for storing vehicular data according to the embodiment may include an analysis unit 401, an acquisition unit 402, an encryption unit 403 and a storage unit 404. The analysis unit 401 may be configured to analyze importance of received vehicular data to determine a storage level of the vehicular data; the acquisition unit 402 may be configured to acquire a corresponding key and a corresponding encryption algorithm based on the storage level of the vehicular data; the encryption unit 403 may be configured to encrypt the vehicular data using the acquired key and the acquired encryption algorithm; and the storage unit 404 may be configured to store encrypted vehicular data in a storage area corresponding to the storage level of the vehicular data.

In the embodiment, the analysis unit 401 may receive and analyze an operation instruction or vehicular data like a vehicle driving state generated by an electronic control unit (ECU) of a vehicle, and vehicular data collected by sensors of the vehicle, to divide the received data into data of different storage levels. Specifically, an importance degree of data may be determined by analyzing an association of the data with an accident and a vehicle malfunction, and may also be determined by detecting whether vehicular data are consistent with simulation data under a normal driving condition. For example, when an inconsistency between vehicular data and simulation data under a normal driving condition is detected, the received vehicular data are determined to be of a high importance degree. The analysis unit 401 may determine a storage level of the received vehicular data based on a preset list of a correspondence between an importance degree and a storage level of vehicular data.

The acquisition unit 402 may acquire a key corresponding to the storage level of the vehicular data determined by the analysis unit 401 from a pre-stored key set, and an encryption algorithm corresponding to the storage level of the vehicular data determined by the analysis unit 401 from a pre-stored encryption algorithm set. Here, the key may be stored based on the TrustZone safe storage application to enhance the safety of the key.

The encryption unit 403 may encrypt the vehicular data using the key and the encryption algorithm acquired by the acquisition unit 402 to generate a ciphertext.

The storage unit 404 may store the ciphertext generated by the encryption unit 403 in a pre-divided storage area corresponding to the storage level of the vehicular data. Specifically, the storage unit 404 may determine a target storage area based on a storage level identifier of each storage area, write the ciphertext in the target storage area, and add an index entry to an index of the target storage area.

In some optional implementations of the embodiment, the analysis unit 401 may be further configured to analyze importance of received vehicular data by means of: determining a data type of the vehicular data based on a type of a sensor collecting the vehicular data or a type of a device generating the vehicular data; acquiring a data transmission speed of the vehicular data; matching the data type and the data transmission speed of the vehicular data with a preset data type and a preset data transmission speed corresponding to each of preset storage levels, and determining the storage level of the vehicular data based on a matching result.

In some other optional implementations of the embodiment, the analysis unit may be further configured to analyze importance of received vehicular data by means of: analyzing the vehicular data, determining whether the vehicular data contain preset critical data corresponding to each of preset storage levels, and determining the storage level of the vehicular data from a plurality of the preset storage levels based on a determining result.

In some embodiments, the apparatus 400 may further include: a configuration unit, configured to set and save a key and an encryption algorithm corresponding to each of the storage levels; where complexities of keys corresponding to different storage levels are different, and speeds of encryption algorithms corresponding to different storage levels are different.

In some embodiments, the apparatus 400 may further include: a division unit configured to divide a storage space into a plurality of storage areas, each of the storage areas at least corresponding to a storage level. When dividing storage areas, a storage level corresponding to each storage area may be set.

It should be understood that the units recorded in the apparatus 400 correspond to the steps in the method described in FIG. 2. Therefore, the operations and characteristics described hereinbefore for the method also apply to the apparatus 400 and the units included therein, and are not repeatedly described here.

The apparatus for storing vehicular data provided by an embodiment of the present disclosure may store vehicular data in different levels based on importance of the vehicular data, use different keys and encryption algorithms for data of different levels, and store the data of different levels to different storage areas, which may increase decryption difficulty of important data to improve the safety of vehicular data, and may enhance the storage speed of ordinary data to improve the storage efficiency of vehicular data.

An embodiment of the present disclosure further provides a device for storing vehicular data. The storage device may be a "black box" for use in an autonomous vehicle, and may also be a server that is connected with an autonomous vehicle via a network and stores vehicular data of the autonomous vehicle in real time. By referring to FIG. 5 below, a schematic diagram of a system structure suitable for implementing a device for storing vehicular data according to an embodiment of the present disclosure is shown.

Figure 5:
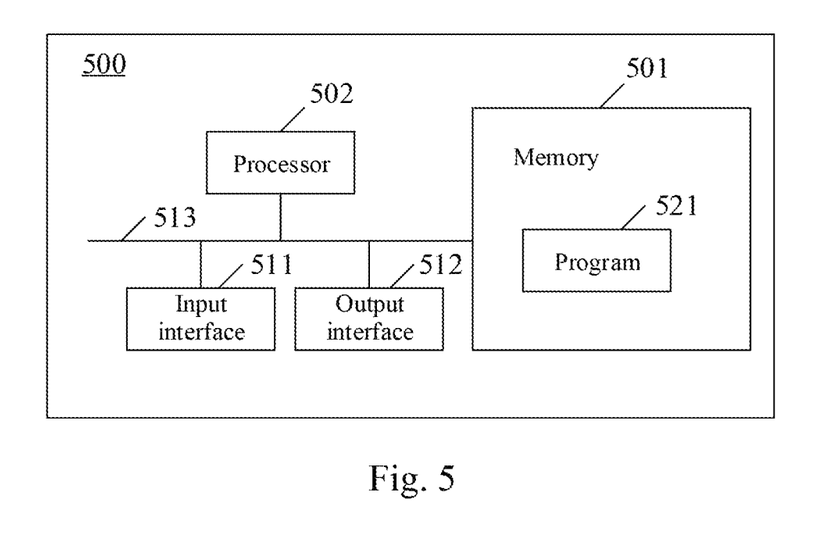
FIG. 5 is a schematic structural diagram of a system of an embodiment of a device for storing vehicular data according to the present disclosure.

As shown in FIG. 5, the device 500 for storing vehicular data may include: a memory 501 and at least one processor 502. Optionally, the storage device 500 may further include at least one input interface 511, at least one output interface 512 and at least one communication bus 513, where the communication bus 513 is used for implementing connection-oriented communication between the above components.

The memory 501 may be used for storing vehicular data, and writing the vehicular data in a corresponding physical address. The memory 501 is further used for storing one or more programs 521. The memory 501 may contain a high-speed random access memory (RAM) and a read-only memory (ROM).

The processor 502 may be, for example, a graphics processing unit (GPU) for executing one or more programs stored in the memory 501. The one or more programs stored in the memory 501 enable, when executed by the processor 502, the processor 502 to implement the method for storing vehicular data as described in FIG. 2.

In particular, according to embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program comprises program codes for executing the method as illustrated in the flow chart. The computer program, when executed by a processor, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an analysis unit, an acquisition unit, an encryption unit and a storage unit, where the names of these units do not in some cases constitute a limitation to such units or themselves. For example, the analysis unit may also be described as "a unit for analyzing importance of received vehicular data to determine a storage level of the vehicular data".

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the apparatus to: analyzing importance of received vehicular data to determine a storage level of the vehicular data; acquiring a corresponding key and a corresponding encryption algorithm based on the storage level of the vehicular data; encrypting the vehicular data using the acquired key and the acquired encryption algorithm; and storing encrypted vehicular data in a storage area corresponding to the storage level of the vehicular data.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:
1. A method for storing vehicular data, comprising:
analyzing importance of received vehicular data to determine a storage level of the vehicular data corresponding to the importance of the vehicular data;

acquiring a corresponding key and a corresponding encryption algorithm based on the storage level of the vehicular data;
encrypting the vehicular data using the acquired key and the acquired encryption algorithm; and
storing encrypted vehicular data in a storage area corresponding to the storage level of the vehicular data, wherein each storage level of the vehicular data corresponds to a storage area;
wherein the analyzing importance of received vehicular data to determine a storage level of the vehicular data corresponding to the importance of the vehicular data comprises:
determining a data type of the vehicular data based on a type of a sensor collecting the vehicular data;
acquiring a data transmission speed of the vehicular data; and
matching the data type with a preset data type corresponding to each of preset storage levels and matching the data transmission speed of the vehicular data with a preset data transmission speed corresponding to each of preset storage levels, and determining the storage level of the vehicular data based on a result of the matching.

2. The method according to claim 1, wherein the analyzing importance of received vehicular data to determine a storage level of the vehicular data corresponding to the importance of the vehicular data further comprises:
analyzing the vehicular data, determining whether the vehicular data contain preset critical data corresponding to each of preset storage levels, and determining the storage level of the vehicular data from a plurality of the preset storage levels based on a determining result.

3. The method according to claim 1, further comprising:
setting and saving a key and an encryption algorithm corresponding to each of the storage levels;
wherein complexities of keys corresponding to different storage levels are different, and speeds of encryption algorithms corresponding to different storage levels are different.

4. The method according to claim 1, further comprising:
dividing a storage space into a plurality of storage areas, each of the storage areas at least corresponding to a storage level.

5. An apparatus for storing vehicular data, comprising:
at least one processor; and
a memory storing instructions, the instructions when executed by the at least one processor, cause the at least one processor to perform operations, the operations comprising:
analyzing importance of received vehicular data to determine a storage level of the vehicular data corresponding to the importance of the vehicular data;
acquiring a corresponding key and a corresponding encryption algorithm based on the storage level of the vehicular data;
encrypting the vehicular data using the acquired key and the acquired encryption algorithm; and
storing encrypted vehicular data in a storage area corresponding to the storage level of the vehicular data, wherein each storage level of the vehicular data corresponds to a storage area;
wherein the analyzing importance of received vehicular data to determine a storage level of the vehicular data corresponding to the importance of the vehicular data comprises:
determining a data type of the vehicular data based on a type of a sensor collecting the vehicular data;
acquiring a data transmission speed of the vehicular data; and
matching the data type with a preset data type corresponding to each of preset storage levels and matching the data transmission speed of the vehicular data with a preset data transmission speed corresponding to each of preset storage levels, and determining the storage level of the vehicular data based on a result of the matching.

6. The apparatus according to claim 5, wherein the analyzing importance of received vehicular data to determine a storage level of the vehicular data corresponding to the importance of the vehicular data further comprises:
analyzing the vehicular data, determining whether the vehicular data contain preset critical data corresponding to each of preset storage levels, and determining the storage level of the vehicular data from a plurality of the preset storage levels based on a determining result.

7. The apparatus according to claim 5, the operations further comprising:
setting and saving a key and an encryption algorithm corresponding to each of the storage levels;
wherein complexities of keys corresponding to different storage levels are different, and speeds of encryption algorithms corresponding to different storage levels are different.

8. The apparatus according to claim 5, the operations further comprising:
dividing a storage space into a plurality of storage areas, each of the storage areas at least corresponding to a storage level.

9. A non-transitory computer storage medium storing a computer program, the computer program when executed by one or more processors, causes the one or more processors to perform operations, the operations comprising:
analyzing importance of received vehicular data to determine a storage level of the vehicular data corresponding to the importance of the vehicular data;
acquiring a corresponding key and a corresponding encryption algorithm based on the storage level of the vehicular data;
encrypting the vehicular data using the acquired key and the acquired encryption algorithm; and
storing encrypted vehicular data in a storage area corresponding to the storage level of the vehicular data, wherein each storage level of the vehicular data corresponds to a storage area;
wherein the analyzing importance of received vehicular data to determine a storage level of the vehicular data corresponding to the importance of the vehicular data comprises:
determining a data type of the vehicular data based on a type of a sensor collecting the vehicular data;
acquiring a data transmission speed of the vehicular data; and
matching the data type with a preset data type corresponding to each of preset storage levels and matching the data transmission speed of the vehicular data with a preset data transmission speed corresponding to each of preset storage levels, and determining the storage level of the vehicular data based on a result of the matching.

10. The method according to claim 1, wherein the type of the sensor collecting the vehicular data comprising a type of a sensor associated with a vehicle collision state, a vehicle malfunction state or a vehicle normal driving state.

11. The method according to claim 1, wherein the analyzing importance of received vehicular data to determine a storage level of the vehicular data corresponding to the importance of the vehicular data comprises:
- determining a data type of the vehicular data based on a type of a device generating the vehicular data;
- acquiring a data transmission speed of the vehicular data; and
- matching the data type with a preset data type corresponding to each of preset storage levels and matching the data transmission speed of the vehicular data with a preset data transmission speed corresponding to each of preset storage levels, and determining the storage level of the vehicular data based on a result of the matching.

* * * * *